United States Patent [19]

Britt

[11] Patent Number: 4,941,189

[45] Date of Patent: Jul. 10, 1990

[54] OPTICAL CHARACTER READER WITH SKEW RECOGNITION

[75] Inventor: Ronald H. Britt, Leicester, England

[73] Assignee: Lundy Electronics & Systems, Inc., Charlotte, N.C.

[21] Appl. No.: 310,532

[22] Filed: Feb. 13, 1989

Related U.S. Application Data

[62] Division of Ser. No. 18,585, Feb. 25, 1987, Pat. No. 4,876,730.

[51] Int. Cl.⁵ ............................................. G06K 9/32
[52] U.S. Cl. ....................................... 382/46; 382/37; 382/48
[58] Field of Search ................... 382/9, 37, 46, 48, 57, 382/58, 65; 358/263

[56] References Cited

U.S. PATENT DOCUMENTS

| | | | |
|---|---|---|---|
| 4,398,177 | 8/1983 | Bernhardt | 382/46 |
| 4,453,268 | 6/1984 | Britt | 382/50 |
| 4,723,297 | 2/1988 | Postl | 382/46 |

*Primary Examiner*—Leo H. Boudreau
*Assistant Examiner*—Jose L. Couso
*Attorney, Agent, or Firm*—Brumbaugh, Graves, Donohue & Raymond

[57] ABSTRACT

An optical character reader (OCR) using parallel state machines is provided wherein each state machine identifies a different character. Program tables for each of the state machines compare received bit strings of scanned data and compare them to positive and negative reference patterns in the state machines, wherein the positive reference patterns are tested for in sequence with advancement of test the next positive reference pattern only if the present positive reference pattern being tested for is present, and if none of at least one negative reference pattern is present. The OCR also detects and corrects skew by mathematically projecting a shadow of each character on the right margin of the page for each of a plurality of small incremental rotation angles for the characters. The rotation angle producing the sharpest and narrowest shadow effect is determined to the angle at which the characters are skewed.

7 Claims, 7 Drawing Sheets

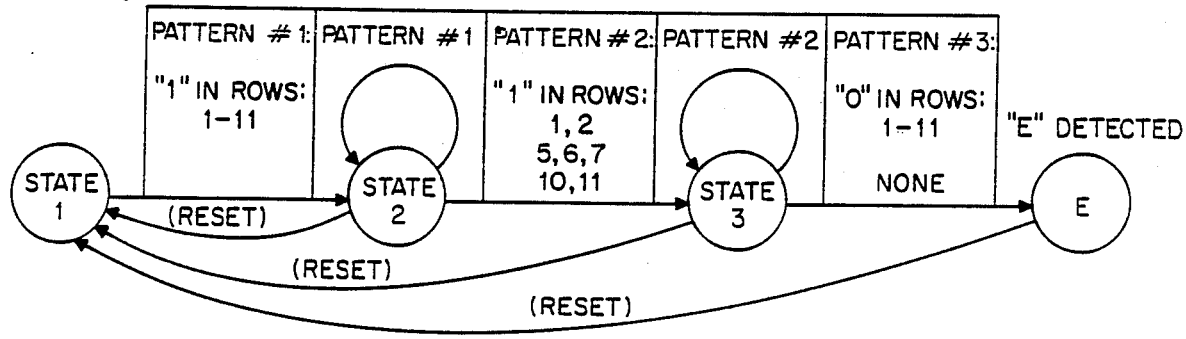
FIG. 1
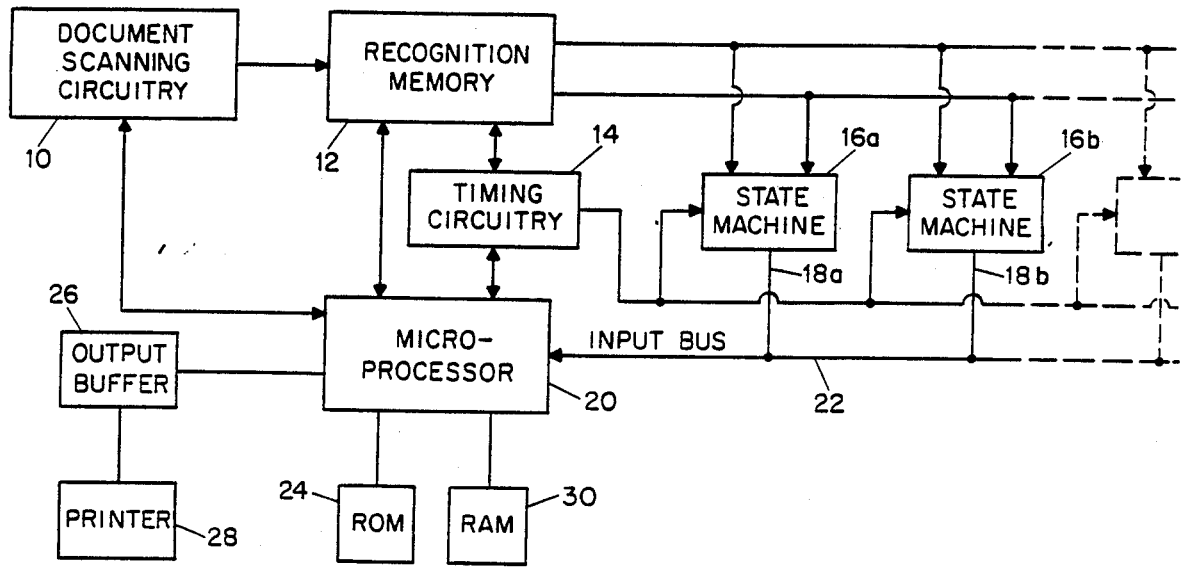
FIG. 2
FIG. 3

| NEGATIVE PATTERN | STATES WHEN LOOKED FOR |
|---|---|
| P10 | (00-07, 20-27) |
| P11 | (00-07, 20-27) |
| P12 | (00-07, 20-27) |
| P13 | (00-07, 20-27), 10-17, 3D, 3E |
| P14 | 10-17, (20-27, 30-37), 3D |
| P15 | (00-07, 10-17, 20-27, 30-37), 3D |
| P16 | (00-07, 10-17, 20-27, 30-37), 3D |
| P30 | (00-07, 20-27) |
| P31 | (00-07, 20-27) |
| P32 | (00-07, 20-27) |
| P33 | (00-07, 20-27) |

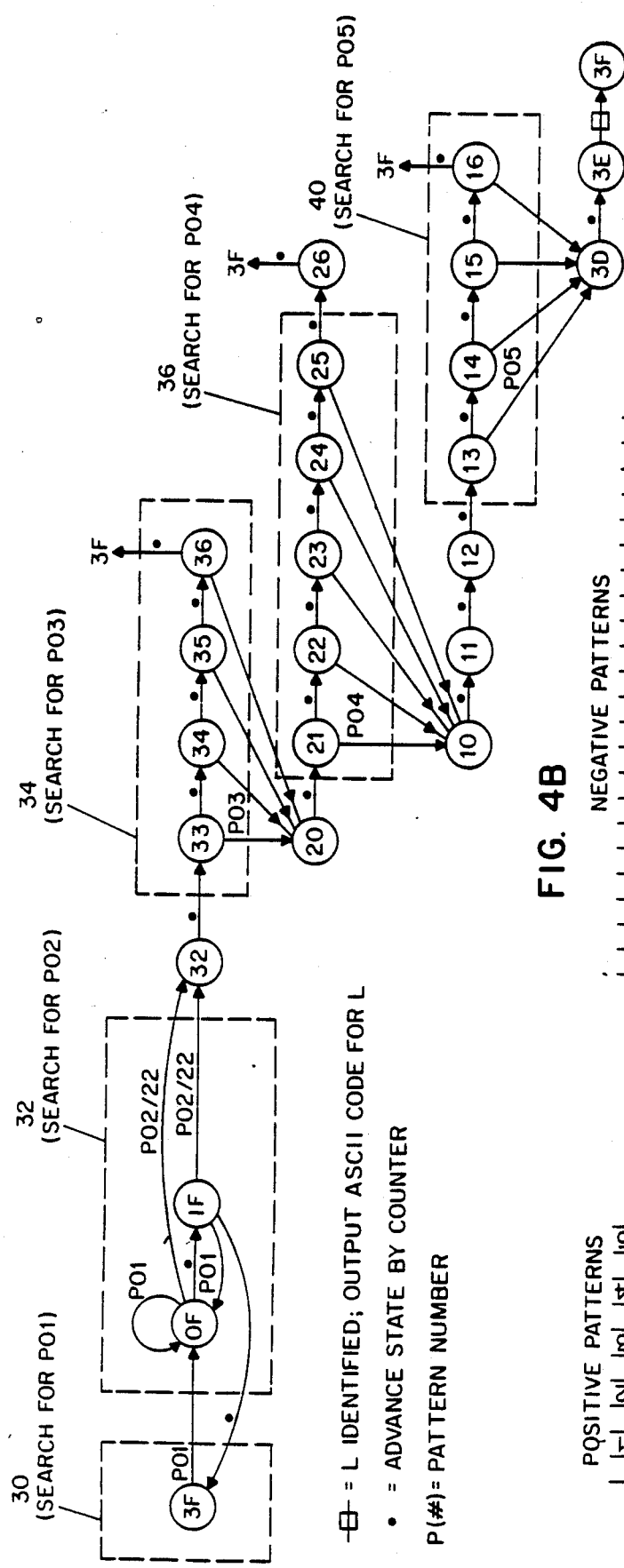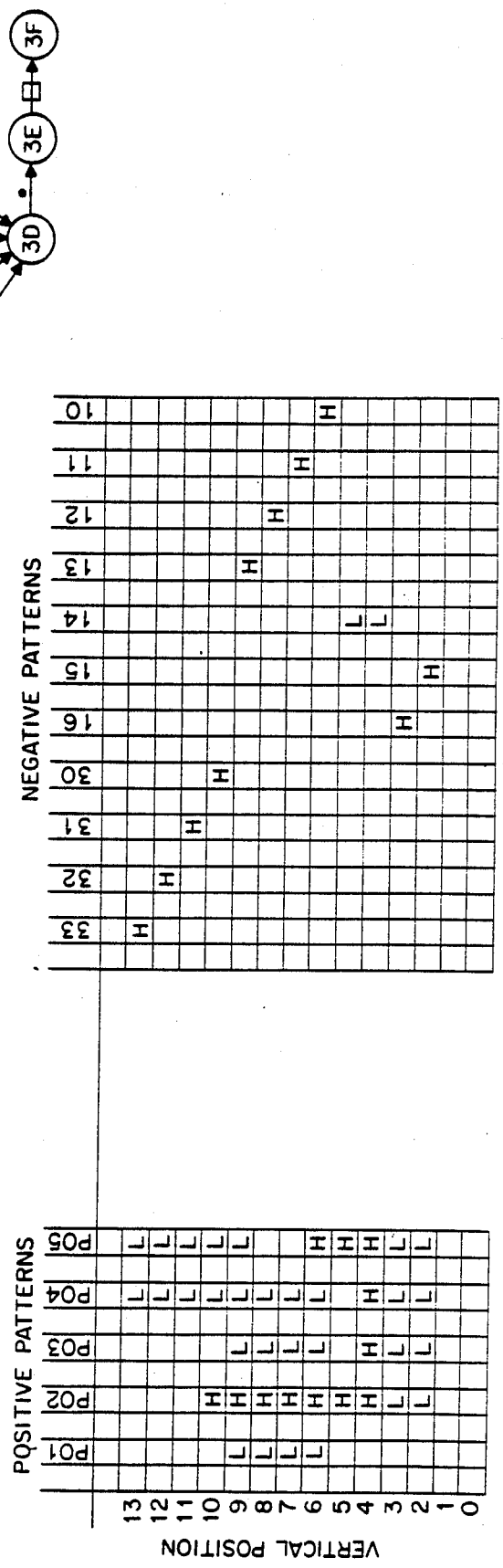
FIG. 4B
FIG. 5

FIG. 7

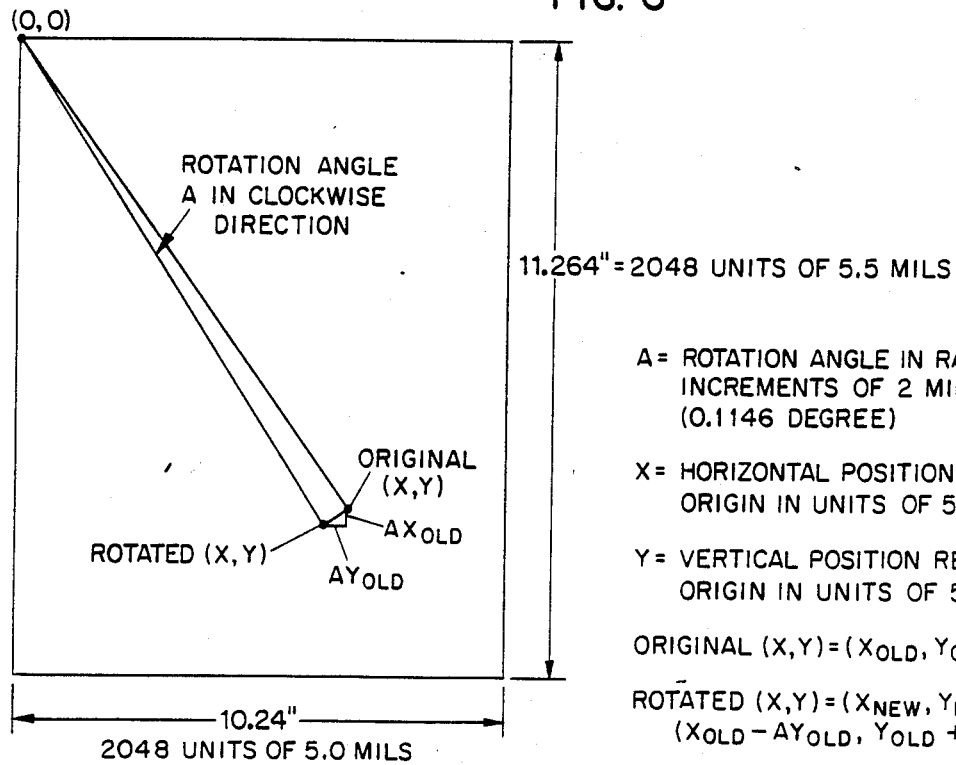

| VERTICAL POSITION | | | | | | | | | | | | | | | | | | |
|---|---|---|---|---|---|---|---|---|---|---|---|---|---|---|---|---|---|---|
| 13 | | | | | | | | | | | | | | | | | | |
| 12 | | ++ | ++ | ++ | ++ | ++ | | | | ++ | ++ | ++ | ++ | | | | | |
| 11 | | | ++ | ++ | ++ | ++ | ++ | ++ | | | ++ | ++ | | | + | | | |
| 10 | | | | +++ | | | | + | | | +++ | | | | | | | |
| 9 | | | | +++ | | | | | | | +++ | | | | | | | |
| 8 | | | | ++ | | | | | | | +++ | | | | | | | |
| 7 | | | | ++ | | | | | | | +++ | | | | | | | |
| 6 | | | | ++ | | | | | | | +++ | | | | | | +|+ | |
| 5 | | | | ++ | | | | ++ | | | +++ | | | | | | ++|+ | |
| 4 | + | ++ | ++ | ++ | ++ | ++ | ++ | ++ | + | | ++ | ++ | ++ | ++ | ++ | ++ | ++ | + |
| 3 | | | | | | | | | | | | | | | | | | |
| 2 | | | | | | | | | | | | | | | | | | |
| 1 | | | | | | | | | | | | | | | | | | |
| 0 | | | | | | | | | | | | | | | | | | |
| STATE OF FPLA FOR THE VERTICAL COLUMN | 00 FF | 01 FF | 33 23 | 22 01 | 22 23 | 22 45 | 11 01 | 11 23 | 333 DEF | 00 FF | 03 F2 | 33 34 | 22 01 | 21 20 | 11 12 | 13 3D | 33 EF | |
| PATTERN DETECTED | PP 00 11 | P 0 1 | P 0 1 | P 0 3 | | P 0 4 | | *P 0 5 | | PP 00 11 | PP 00 12 | | P 0 3 | | P 0 4 | | *P 0 5 | |

+ = BLACK OR "1"
BLANK = WHITE OR "0"

* = L IDENTIFIED

FIG. 6

A = ROTATION ANGLE IN RADIANS IN INCREMENTS OF 2 MILLIRADIANS (0.1146 DEGREE)

X = HORIZONTAL POSITION RELATIVE TO ORIGIN IN UNITS OF 5.0 MILS

Y = VERTICAL POSITION RELATIVE TO ORIGIN IN UNITS OF 5.5 MILS

ORIGINAL $(X,Y) = (X_{OLD}, Y_{OLD})$ $\overline{\text{ROTATED}}$ $(X,Y) = (X_{NEW}, Y_{NEW}) = (X_{OLD} - AY_{OLD}, Y_{OLD} + AX_{OLD})$

FIG. 8

OPTICAL CHARACTER READER WITH SKEW RECOGNITION

This application is a divisional of application Ser. No. 018,858 filed on Feb. 25, 1987, now U.S. Pat. No. 4,876,730.

BACKGROUND OF THE INVENTION

The present invention relates to an optical character reader (OCR) and more particularly to an optical character reader using parallel state machines for recognizing characters. The present invention also relates to an optical character reader for detecting the amount of tilt or skew present in each line or column of characters in a document.

One type of OCR page reader device is disclosed in U.S. Pat. No. 4,453,268 to Britt, issued June 5, 1984, entitled "OCR Page Reader". The optical character reader in this patent employs parallel state machines each connected to receive vertical bit slices or columns of data in the forms of ones and zeroes respectively indicating the presence of black and white in vertical columns of a scanned character. Each column data is simultaneously applied to a plurality of separate state machines with one state machine being provided for each character that can be recognized. Each state machine includes a separate field programmable logic array (FPLA) device and an associated output latch connected in wraparound fashion to the FPLA.

One figure of that patent, reproduced in a slightly modified form as FIG. 2 herein, shows a simplified state diagram or map for recognizing the upper case character E in an OCR-B type type-font, as shown represented in another figure of that patent, which is reproduced as FIG. 1 herein. The state machine diagram of FIG. 2 comprises four steps or stages. In state 1, the initial stage, the device looks for the presence of black in vertical positions 1 through 11 (designated as pattern #1), indicating the left most vertical limb of the upper case E. If found, the state machine will advance to state 2, otherwise it will remain in state 1. When in state 2, the state machine looks for pattern #2, which is a pattern of three rightwardly extending horizontal limbs distinctive for the E, i.e. black in upper vertical positions 1, 2; black in middle vertical positions 5, 6 and 7; and black in lower vertical positions 10 and 11. If pattern #2 is found, the state machine will advance to state 3, but if pattern #1 is still being found, the state machine will stay in state 2. For all other patterns, the state machine will reset to state 1. When in state 3, the state machine looks for the end of the character indicated by pattern #3, which is all zeroes in vertical positions 1 through 11. If such is the case, the state machine will advance to the fourth state and output a signal indicating that the character is recognized as an upper case character E. However, if pattern #2 is still being detected, the state machine stays in state 3. For all other patterns, the state machine will reset to state 1.

Such a device is very useful for identifying characters on a document which are all in the same or similar type font However, when type fonts are mixed on each page, or when scanning different documents produced with different type fonts, the relatively simple programming of that state machine as disclosed has its limitations in accurately identifying, with a high recognition rate, all of the characters appearing on the document.

Furthermore, in accordance with the device disclosed in this reference patent, the state machine can remain in a given state indefinitely as long as it continues to recognize the same pattern which caused it to advance to that state. For example, as shown in FIG. 2, the state machine will remain in state 2 if it continues to detect pattern #1, i.e. black in columns 1 through 11. In such an arrangement, there is no maximum time within which a character will be identified.

Further, no means are provided in this patent for detecting the amount of skew or tilt in a line of characters on a document, and to correct the relative positions of the characters so that a reprinting of the characters by associated printing means will correct for vertical and horizontal tilt or skew.

SUMMARY OF THE INVENTION

It is an object of the present invention to provide an OCR device capable of recognizing a number of different various type fonts, or modified versions of a particular font, either interspersed within each document, or on separate documents, without the need to provide control characters or other indication to the OCR that a type-font has been switched from one type to another.

It is another object of the present invention to provide a device which detects and corrects the amount of tilt or skew of the lines of a document so that the amount of tilt or skew may be corrected when the recognized characters are printed out by an associated printer.

It is yet another object of the present invention to provide an OCR device using parallel state machines wherein a separate state machine is provided for each character to be detected, and wherein the state machines are programmed to advance to a different state upon receipt of each slice or column of data even if a pattern is repeated. In such an arrangement the state machine will not stall in a single state and the character recognition rate can be kept within known time limits, in dependence upon the maximum number of state changes needed to recognize a character, and the time between each state change, which is generally determined by the clock pulse rate.

It is still a further object of the present invention to provide an arrangement wherein patterns, or modifications thereof, which positively identify certain features of a character are looked for in a state or sequence of states, and upon detection of said positive identification features, a state machine advances to another state or sequence of states to look for other positive features. The state machine will reset to the beginning state upon failure of a particular feature to be identified in a state or sequence of related states. The invention also provides for negative pattern testing in at least some of the states, wherein the presence of such a negative pattern substantially rules out the possibility that the character under test is the character of the associated state machine, and thereupon immediately resets the state machine to the beginning or initial state upon detection of said negative pattern.

According to the invention, an optical character recognition system is provided comprising optically sensitive means for scanning characters on a document, and for producing successively bit strings representing the black character bits or white background bits in slices of each character in sequence. A plurality of state machines are also provided connected to receive said bit strings, with each state machine being provided for each different associated character to be recognized by programming each state machine with a different program table, and wherein each state machine changes state in accordance with its program table in response to receipt of said bit strings. Each of said program tables provides, in sequence, a plurality of pattern tests each having a positive reference pattern, said positive reference patterns being characteristic of the state machine's associated character, against which said received bit strings are compared, and wherein each program table compares a received bit string with the same positive reference pattern in a positive reference pattern test until a received bit string compares favorably with the positive reference pattern, whereupon said state machine changes state to advance to the next positive reference pattern test. The received bit strings are also compared to at least some negative patterns at each state, wherein the presence of a negative pattern indicates that the character under test is not the character associated with that state machine. Each program table also causes its respective state machine to reset to an initial machine state upon failure of a predetermined number of sequentially received bit strings to compare favorably with one of the respective positive reference patterns or in response to a received bit string comparing favorably with a negative reference pattern which substantially rules out the possibility that the character under test is the character associated with the particular state machine. A character will be identified in response to one of said state machines reaching and comparing favorably with the last of its positive reference pattern tests in the sequence. By providing a number of opportunities for a positive reference pattern to be matched with received bit strings in the program tables, and by providing testing of the received bit strings against negative reference patterns, versions of respective characters may be tested for and identified with a high degree of accuracy In accordance with another aspect of the invention, an optical character recognition device is provided for detecting the amount of skew of characters arranged in lines and columns on a document. This aspect of the invention comprises character scanning means for scanning a document having characters arranged in lines and columns on said document, and for producing, for each character, information indicative of the identity of the character and the original coordinate position of the character relative to a reference point on the document Means are provided for calculating new coordinate data of each character by rotating each character about the reference point through each of a plurality of rotation angles Shadow effect calculation means are provided for calculating the shadowing effect that each character creates along at least one margin of the document for the unrotated characters and for said plurality of rotation angles. Shadow effect detection means are provided for detecting which of the rotation angles (including the rotation angle of zero) creates the narrowest shadow effect along said margin of the document, and taking this rotation angle (or the zero rotation angle) as the angle at which the characters are skewed or positioned on the document.

BRIEF DESCRIPTION OF THE DRAWINGS

The foregoing and other features of the invention will become more readily apparent from the following description of an illustrative embodiment and the accompanying drawings, in which:

FIG. 1 is a diagram of scanned data obtained from scanning an upper case character E;

FIG. 2 is a simplified state diagram for a state machine programmed to recognize the upper case character E according to the prior art;

FIG. 3 is a block diagram of the electronic components of the optical character reader according to the invention;

FIG. 4A is a simplified flowchart of the program table decision scheme for the state machine for recognizing the upper case character L according to the invention, showing each pattern test as one step, and eliminating certain features;

FIG. 4B is a state diagram similar to the flowchart of FIG. 4A, showing each sequential positive reference pattern test in more detail;

FIG. 4C is a table indicating at what states the negative patterns are checked for;

FIG. 5 is a diagram showing the bit maps for each of the positive and negative reference patterns checked for in the flowchart of FIG. 4A for the upper case character L;

FIG. 6 is a diagram of data obtained from scanning two versions of the upper case character L, while also showing the state of the state machine after receiving each column of data and the particular positive pattern or bit map of FIG. 5 which has been detected;

FIG. 7 is a program table showing in detail the program for the state machine for the upper case character L corresponding to the flowchart of FIG. 4A;

FIG. 8 is a diagram illustrating the coordinate system used according to the invention, also illustrating the new coordinates for an original character location rotated clockwise by an angle A;

DESCRIPTION OF THE PREFERRED EMBODIMENT

Figures 4A, 4C:
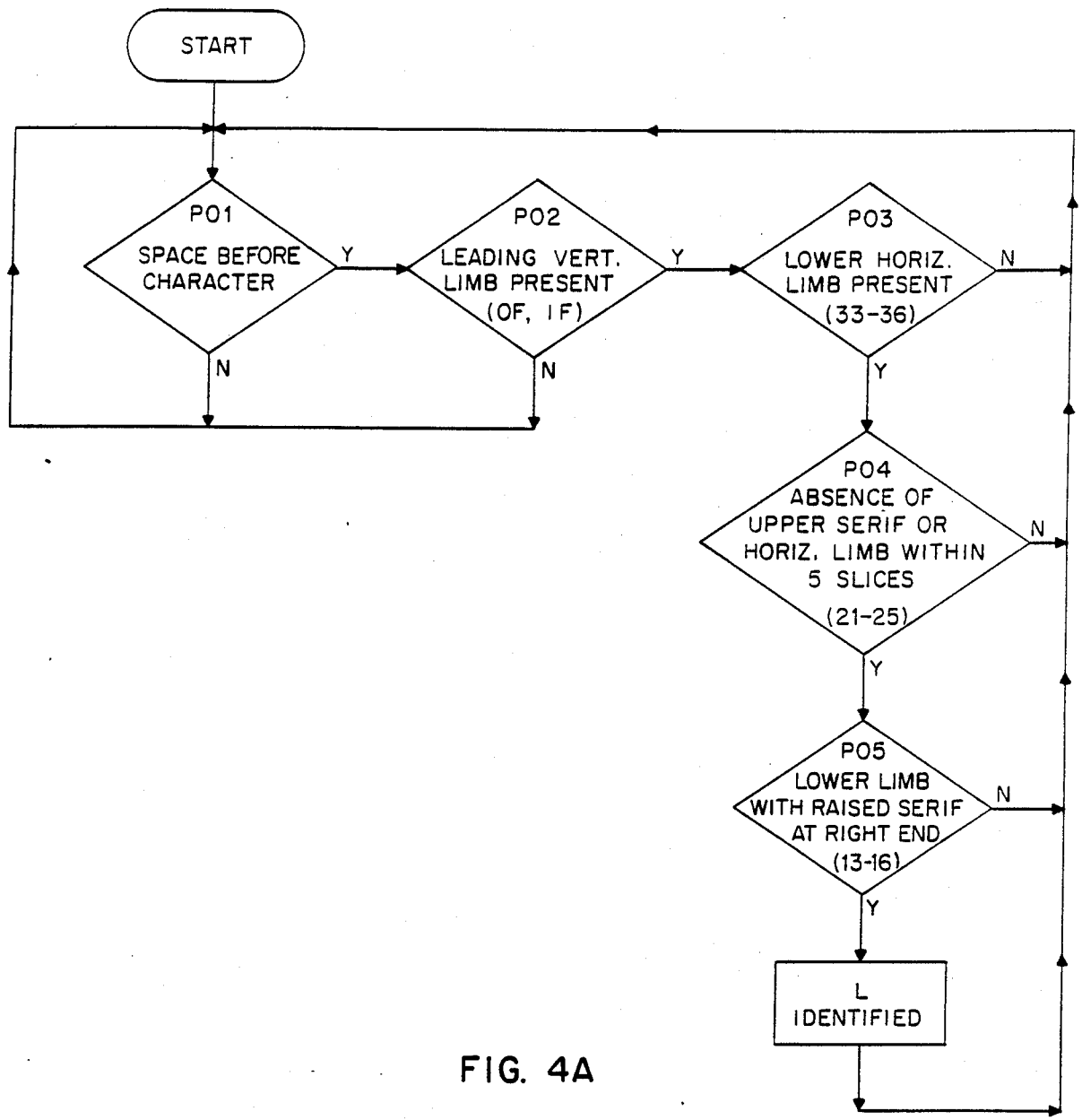

Referring to FIG. 3, the preferred embodiment according to the invention comprises document scanning circuitry 10 and recognition memory 12, which may be the same scanning circuitry and memory described and illustrated in the prior Britt U.S. Pat. No. 4,453,268 cited above. Such circuitry and memory produce binary bit strings of ones and zeros of vertical slices of scanned characters, like that shown in FIGS. 1 and 6 herein. In FIG. 6, the bit string produced is only 13 bits long, corresponding to the 13 vertical positions indicated. The black or white present in the positions between the adjacent numbered vertical positions is ignored in the preferred embodiment, but of course can be obtained if greater resolution is desired.

The recognition circuitry provides the vertical slices or bit strings in sequence, under the direction of the timing circuitry 14, to parallel state machines 16a, 16b, etc., which are connected as shown. A state machine is provided for each character to be recognized by providing each state machine with a different program table, described more fully below, which compares the received bit strings with stored reference patterns (positive patterns) unique for the particular character which it recognizes. The output lines 18a, 18b, etc. of the state machines output the ASCII code of any character recognized by its associated state machine. The microprocessor 20 receives the ASCII code along its input bus 22 and stores the ASCII code, along with coordinate information indicating the horizontal and vertical coordinates of the character on the document scanned, into RAM memory 30. The microprocessor runs under the control of a control program stored in ROM 24. An output buffer 26 connected to the microprocessor receives the ASCII code information along with character position information (original coordinate position adjusted by any rotation to adjust for skew as described below) and provides the information to a printer 28 which prints out the recognized characters in their corrected position.

A unique aspect of the present invention concerns the state machine programming for identifying characters in any one of a number of different type fonts or modified versions, and this will now be described.

State Machine Function and Complement Array Feature

Figure 7:
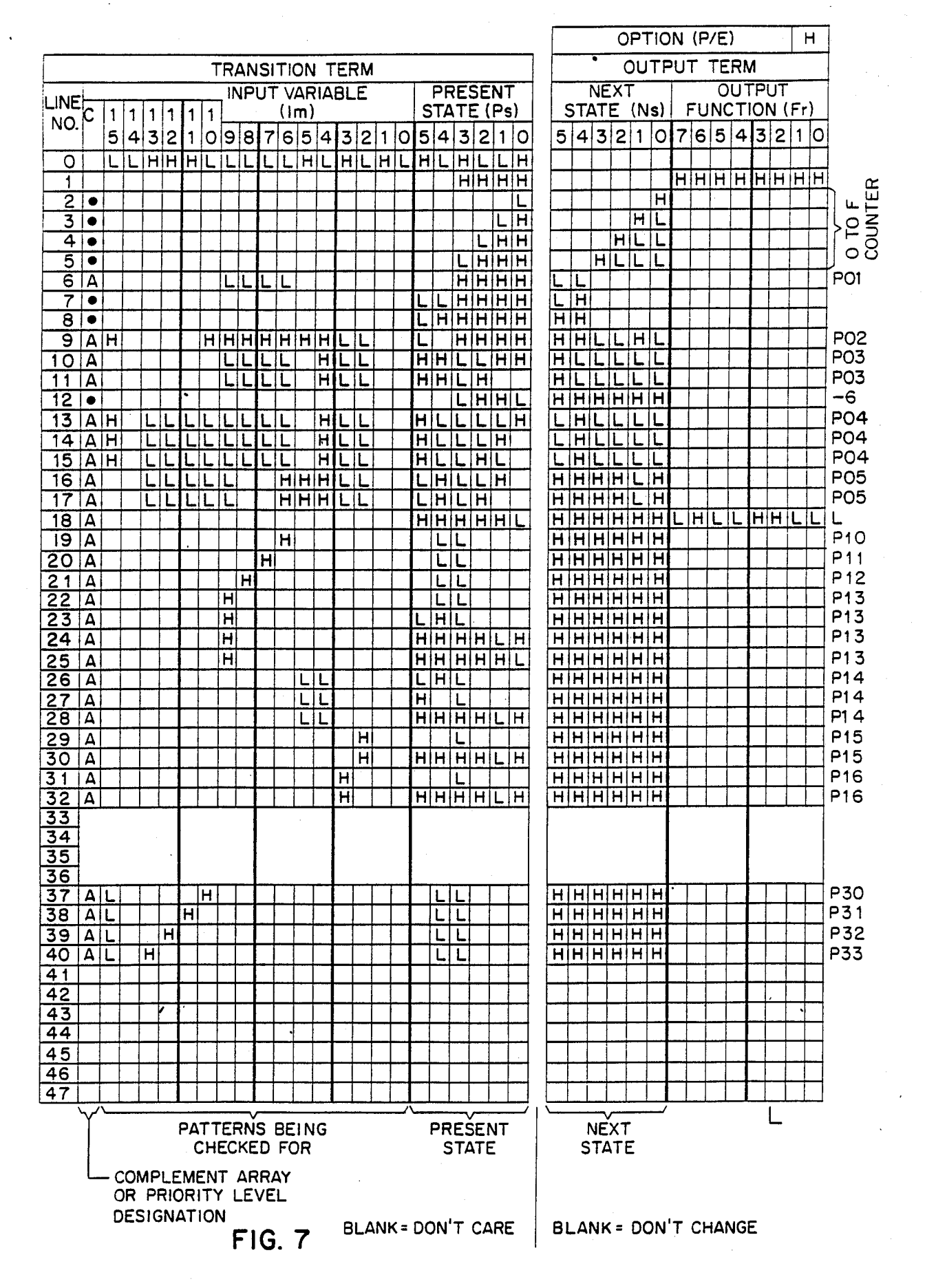

A brief description of FIG. 7 will now be given as an aid to understanding the operation of the state machine given below. The particular state machine used in this embodiment is a Signetics model 82S105 FPLS. If the FPLS is in a particular present state as shown in a particular line of FIG. 7, and receives an input variable (of up to 16 bits) which matches the input variable stored or programmed into the machine for the present state of the machine, the device will advance to the next state shown in the figure upon receipt of a clock pulse from the timing circuitry. In addition to advancing to the next state as shown, the FPLS will output a particular output function if it is programmed to do so.

The FPLS is provided with means for establishing two levels of priority when making the comparisons of the input variable received by the FPLS with the stored input variables programmed into the device. According to this arrangement, in the column entitled "Complement Array" in FIG. 7, the designation A denotes a first level of priority comparison, and a dot (.) represents a second level of priority comparison, which is performed by default if either (1) a first level of priority comparison is not available for the present state, or (2) none of the conditions stated in any of the first level priority comparisons is satisfied.

When the FPLS receives an input variable for making a comparison, it compares the input variable with the stored values for the present state which the FPLS is in, by first comparing the received input variable only for the rows provided with an A designating the first priority of comparison, while initially ignoring those rows designated by a dot in the complement array. If, for given present state, the input variable received satisfies or compares favorably with the input variable stored in the program table for a row having a complement array of A, then the FPLS advances to the next state indicated for that row. If an advance in the state of the FPLS cannot be made by any of the rows having an A in the complement array, only then will the device make a comparison of the input variable for the rows having a dot in the complement array dor the given present state.

Counter Function of State Machine

A counter implements most of the transitions called for by the dot array. The counter of lines 2 through 5 of FIG. 7 is a 4 bit counter for the least significant digit of the state of the state machine expressed in hexadecimal. Lines 7 and 8 of FIG. 7 comprise a means for changing the most significant digit of the state for the state machine expressed in hexadecimal, but are used only when the least significant digit of the state is F.

State Machine Operation For Upper Case L

Before proceeding with a detailed description of the operation of the state machine according to the detailed state diagram of FIG. 4B, a more brief description will be given with reference to the state diagram of FIG. 4A. The state diagram of FIG. 4A shows the steps of the program table for comparing the received bit strings with the positive reference patterns P01, P02, P03, P04 and P05 which positive reference patterns are shown in FIG. 5, wherein H indicates black or "1" and L indicates no black or "0", with a space indicating "don't care" In FIG. 5, the line between vertical positions 3 and 4 indicates the base line of a character. All upper case characters will be located entirely above the base line, and only lower case characters with descenders, i.e. g, j, p, q and y, will have portions below the base line.

The program table compares the received bit string (a new one being provided upon each clock pulse) with the positive reference patterns shown. In block 30, positive pattern P01, indicating the space before the character L will be searched for and if found, the program proceeds to block 32, where positive pattern P02, which is the leading vertical limb of the L, is checked for If found, the program proceeds to block 34, where positive pattern P03, which is the lower horizontal limb of the L, is checked for. If found, the program proceeds to block 36, where positive pattern P04, which is the presence of a lower horizontal limb and the absence of any trailing upper serif or other limb, within 5 bit string cycles, is looked for. If positive pattern P04 is found in block 36, block 40 then looks for positive pattern P05, which is the horizontal lower limb with a raised serif at the right end. If found, this state machine determines that the character is L and outputs ASCII code for the L, and then resets to the start position In addition to searching for the positive reference patterns as discussed above, the program table also compares the received bit strings against negative reference patterns. FIG. 4C shows the states at which the negative reference patterns are looked for and FIG. 5 shows the particular negative reference patterns. By way of example, negative reference patterns 15 and 16 will compare favorably to the lower case characters with descenders, i.e. g, j, p, q and y. These negative reference patterns are searched for in almost every state, and the state machine will reset to the initial state 3F upon detection of either of these negative reference patterns.

The description of the state diagram of FIG. 4B will now be given for the upper case character L shown in FIG. 3. The blocks indicated by dotted lines in FIG. 4B correspond to the same blocks in FIG. 4A. During this description, reference will also be made to FIG. 5 which shows the bit maps for each of the positive patterns involved in recognizing the upper case character L and used by the state machine diagram in FIG. 4B, and the negative reference patterns. Reference will also be made to FIG. 7 which is a program table for the FPLA for the upper case character L. FIG. 6 shows an upper case character L produced using two different type fonts.

A. Leading Vertical Limb

The state machine starts in the reset state 3F as shown in FIG. 4B. At this time the pattern P01 is being looked for. As shown in FIG. 5, the pattern P01 consists of a L (low) bit, indicating absence of black, in vertical positions 6, 7, 8, and 9, and is also shown on line 5 of FIG. 7. When pattern P01 is detected when in state 3F, the state machine moves from state F to state 0F (see line 6 of FIG. 7 where the present state of --HHHH is changed to LLHHHH, with --=don't care).

When the state machine is in state 0F it first looks for either pattern P01 to repeat or pattern P02. A repeat of pattern P01 will cause the state machine to remain in state 0F. However, an occurrence of pattern P02 will cause the state machine to advance to state 32. Pattern P02 is shown in FIG. 5 to comprise a H (high) bit in vertical positions 4 through 10 and a L bit in vertical positions 2 and 3. This is also shown in line 9 of FIG. 7. In FIG. 3, the state of the FPLA for each vertical column is shown in the lower portion of the figure, and it is seen that the state machine analyzing each of the two fonts goes to state 32 upon detection of pattern P02. However, when in state 0F, if pattern P01 is not present, by default the state machine takes the dot route to state 1F by means of the state advance means (see line 7, of FIG. 7). When in state 1F, the machine advances to state 32 if pattern P02 is present, or back to state 0F if pattern P01 is present Otherwise it goes back to reset state 3F by default (by the dot route or state advance means). Reaching state 32 means that the leading vertical limb of L has been found.

B. Lower Horizontal Limb

When in state 32, since the vertical limb has just been found, and we know that the vertical limb is at least two columns wide, the state machine does not undergo any pattern matching or checking in state 32, and therefore none of the A priority tests are provided for state 32. By default, the dot transition tests are used whereby the state is advanced to state 33 (see line 2 in FIG. 7 wherein --HL is changed --HH). In states 33 through 36, the pattern P03 (low in vertical positions 2, 3 and 6 through 9 and high in position 4) is looked for. P03 is the presence of the lower horizontal limb but with no vertical limb or other horizontal limbs. If pattern P03 is found when in state 33, the state machine goes directly to state 20. If pattern P03 is not found right away, the state machine advances by means of the state advance means or dot transitions to states 34, 35 and 36 in sequence if pattern P03 is not found at any of these states. (See lines 2 through 4 of FIG. 7 wherein −3 changes to −4 in line 4; −4 changes to −5 in line 2; and −5 changes to −6 in line 3). If pattern P03 is not found in state 36, indicating that no lower limb has been found, the state machine advances by the state advance means to state 3F, which is the reset state. (See line 12 of FIG. 7).

C. Upper Horizontal Limb

Once pattern P03, indicating the lower limb, has been found, we know that the vertical slice or pattern under consideration contains both the lower horizontal limb and the right edge of the upper serif in the upper case L, which serif will continue to be present for a few more slices. Therefore, we don't need to look for the absence of the upper serif for at least one cycle, and accordingly no pattern is looked for in state 20. The state machine is automatically advanced by the state advance means (line 3 of FIG. 7) to state 21. When in any one of states 21 through 25, the pattern P04 (absence of top limb wherein white is found in vertical positions 2, 3 and 6 through 13 and black is found in vertical position 4) is looked for. If the pattern P04 is found in any of these states, the state machine advances to state 10 indicating that the top limb or serif has ended. However, if the state reaches state 25 and the upper serif is still present, the state machine advances to state 26 and then to the reset state 3F.

D. Lower Limb With Serif At Right End

If the state machine advances to state 10 indicating that pattern P04 is found (end of the top limb or serif in the horizontal center of the character), we know that since we have just detected the end of the upper trailing serif, it will be at least three bit slices before we can expect a raised serif above the lower limb. We therefore advance from state 10 to 11 to 12 to 13, with no check for patterns, by using the dot transition routes. At state 13 is when we first start to look for pattern P05, which is the lower limb with a raised serif at the extreme right (see pattern P05 in FIG. 5 where H is present in vertical positions 4, 5 and 6, and L is present in vertical positions 2, 3 and 9 through 13). If pattern P05 is found in any of states 13, 14, 15 or 16, the state machine advances to state 3D (see lines 16 and 17 of FIG. 7). When in state 3D, the state machine advances automatically to state 3E after which, as indicated in line 18 of FIG. 7, the ASCII code for L is shown as the output function. The state machine then advances to the reset state 3F.

E. Examples of Different Versions for Upper Case L

FIG. 6 shows the bit strings obtained by scanning two different versions of the character L, also showing the state of the state machine or FPLS assumed after receiving the bit string or column of data just above it, and the particular pattern detected. One can see that the state sequence for each of the two different versions is different, but that the program table identifies each version as the character L.

Tilt Or Skew Recognition and Correction

The arrangement for detecting and correcting the amount of tilt or skew in characters on a document will now be described in conjunction with FIGS. 8, 9A-C and 10, after a summary description of the concepts involved. Tilting or skewing of characters on a document being scanned may be attributable to incorrectly aligning the document in the page reader housing prior to scanning the document, or may be due to the characters being incorrectly aligned on the document itself. This latter condition may occur because the paper was fed on an angle into the typewriter or printer which produced the document As shown in the flow chart of FIG. 10, when the document is scanned by the optical character reader and the characters are identified by the parallel state machines, the microprocessor executes instructions to store into memory means (1) data representing the identity of the character (in ASCII code), and (2) positional data indicating the location of each such character identified on the document by its horizontal and vertical coordinates relative to the origin (X=0, Y=0) coordinates at the upper left corner of the document (see FIG. 8). In FIGS. 8, 9A, 9B, and 9C, each character is represented graphically by a dot representing, say, the approximate center of the recognized character. The microprocessor then executes a control program wherein each line of characters is evaluated to see what shadowing effect each character creates on the right hand margin of the document when they are mathematically rotated on the page at predetermined incremental angles about the origin. The shadowing effect is first computed for the character lines in their raw data state (unrotated). If the character lines were perfectly straight with each character in a line having exactly the same vertical coordinate as all other characters in the same line, e.g. FIG. 9A, then the cumulative shadow effect produced by all of the characters along the right hand edge of the page would be a sharp maximum at the vertical coordinate positions and no shadow between those lines. The microprocessor then mathematically rotates each character, on a character by character basis, through increments of a certain angle, (preferably 2 milliradians or 0.1146 degrees), relative to its initial coordinates according to certain formulas (see FIG. 8 and more detailed discussion below), and computes the shadow effect along the horizontal perpendicular at the right edge of the page. The shadowing computation is done for each character in the line and for all lines and for each 2 milliradian incremental rotation from 0 to 30 milliradians in both the clockwise and counter-clockwise rotational directions. The angle which produces a shadowing effect having the most pronounced and largest peaks separated by little or no shadows is chosen as the angle of tilt or skew for that particular line. The microprocessor also computes the shadowing effect on the bottom of the document along vertical axes and also uses these results to determine vertical skew as well.

Once the amount of skew for is determined, the coordinates for all of the characters are rotated according to formulas $X_{new} = X_{old} - AY_{old}$, and $Y_{new} = Y_{old} + AX_{new}$, where A is the rotation angle in radians These equations hold for characters rotated relative to the origin (X=0 and Y=0 in the upper left corner of the document). For counter-clockwise rotation, the plus and minus signs in the equations will be reversed. These equations are derived from more complex mathematical equations, but give relatively accurate results for the relatively small values of A involved here Program For Skew Detection and Correction The arrangement for determining the optimum rotation angle comprises 2048 single bit registers, one for each of the 2048 vertical line positions or units of the page as shown in FIG. 8. At the beginning of the tilt detecting operation, all of the registers are reset to zero. The shadowing effect of the raw or unrotated data is then determined by setting the value of each line register having a character on its respective line to one. For example, in FIG. 9A, the line registers for lines 3 and 11 will be set to have a value of one since there is at least one character on each of those lines. Since no characters are located on lines 1, 2, 4–10, 12 and 13, the registers for those lines remain at zero.

After all of the characters on the document have been shadowed onto the registers, the contents of all the registers are summed and stored along with the rotation value for that rotation angle. For example, in FIG. 9A where the lines of characters are perfectly straight, and wherein only two registers have a value of 1, the register sum of 2 will be stored for the rotation angle of zero. The line registers are then all reset to zero and the coordinates of all of the characters on the page are rotated by 2 milliradians according to the formulas given above. Then each line register having a rotated character on its respective line is set to one. After all characters have been rotated and shadowed onto the line registers, the contents of all of the line registers are summed and the result is stored along with the value of the rotation angle which produced that particular shadowing effect. The registers are then all reset to zero, and the above process is repeated for the next rotation angle.

Figure 9A:
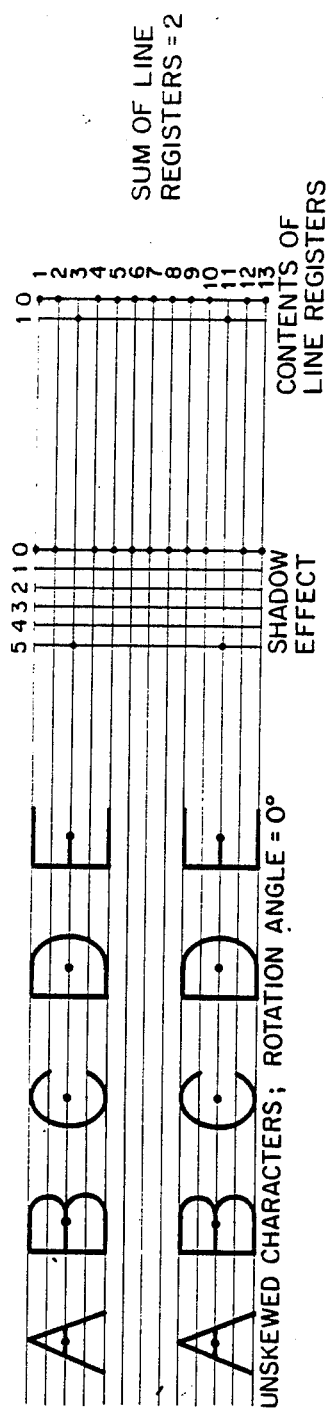
FIG. 9A is a diagram of unskewed characters on a document, and the shadow effect they create on the right margin of the page, along with the contents of line registers used according to the invention for detecting the amount of any skew of the characters.
Figure 9B:
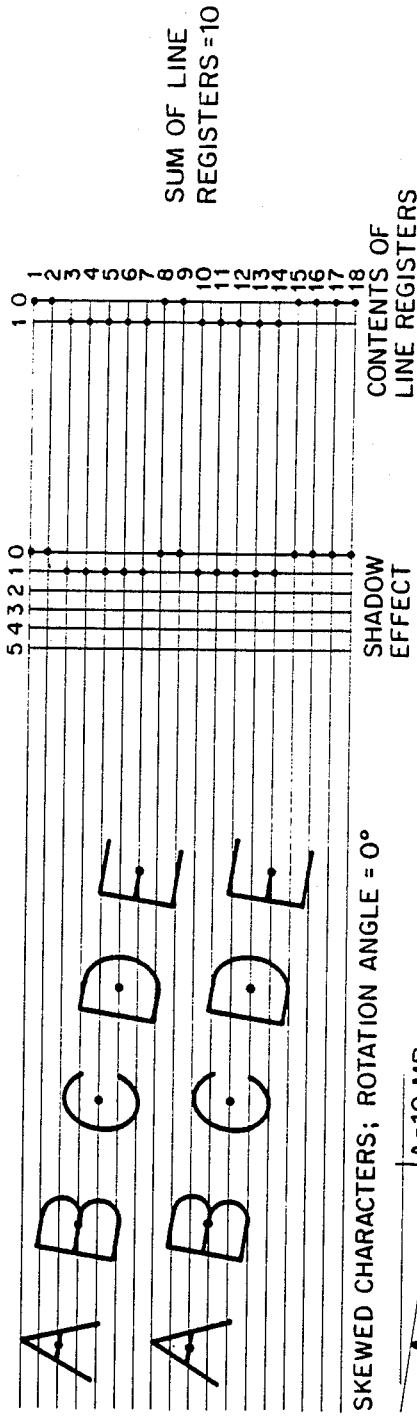
FIG. 9B is a diagram similar to FIG. 9A, except showing skewed characters.

FIG. 9B illustrates in simple fashion two lines of text in a document which appear skewed to the page reader. One can see that the shadow effect of these ten characters is more spread out than the shadow effect for the straight line characters in FIG. 9A, and the shadowing of the unrotated characters onto the line registers as shown on the right of FIG. 9B show line registers 3–7 and 10–14 each having a value of one since at least one character appears on the respective line for each of these line registers. The sum of the line registers is ten, and this value is stored for the rotation angle of zero.

In accordance with the process described above, the registers are then all reset to zero and all of the characters are then rotated by the first rotation angle increment, which in the preferred embodiment is 2 milliradians, according to the formulas given above. The rotated characters are then shadowed onto the line registers, the line registers are then summed and the sum is stored for the rotation angle of 2 milliradians. The registers are reset to zero, and the process is then repeated for further incremental rotation angles.

Figure 9C:
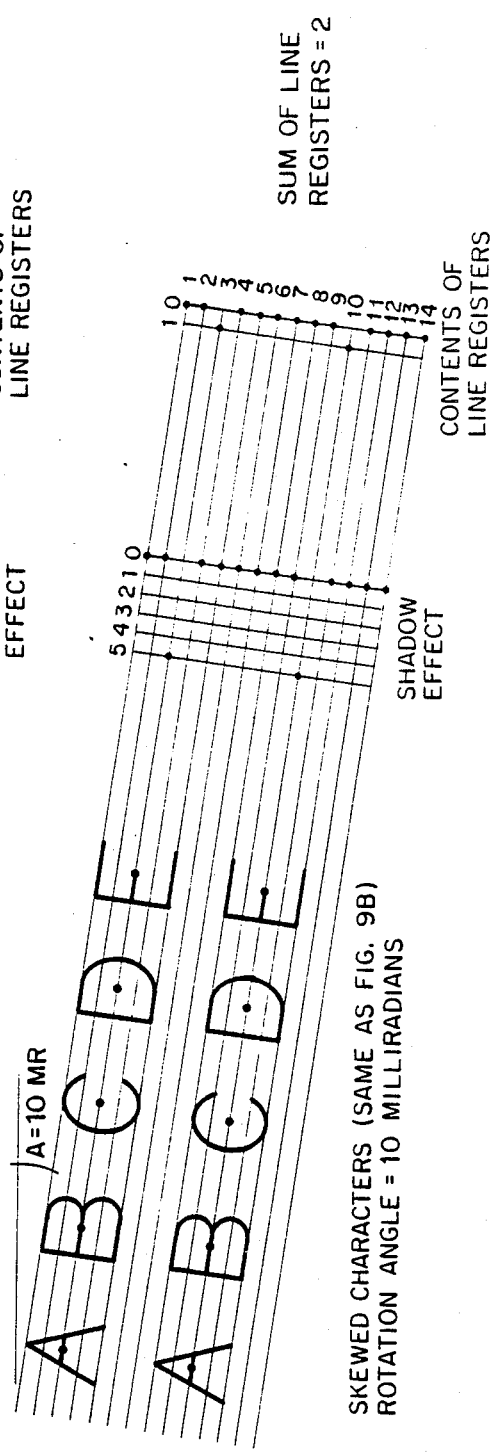
FIG. 9C is a diagram similar to FIG. 9B, except showing the skewed characters rotated by a certain rotation angle.
Figure 10:
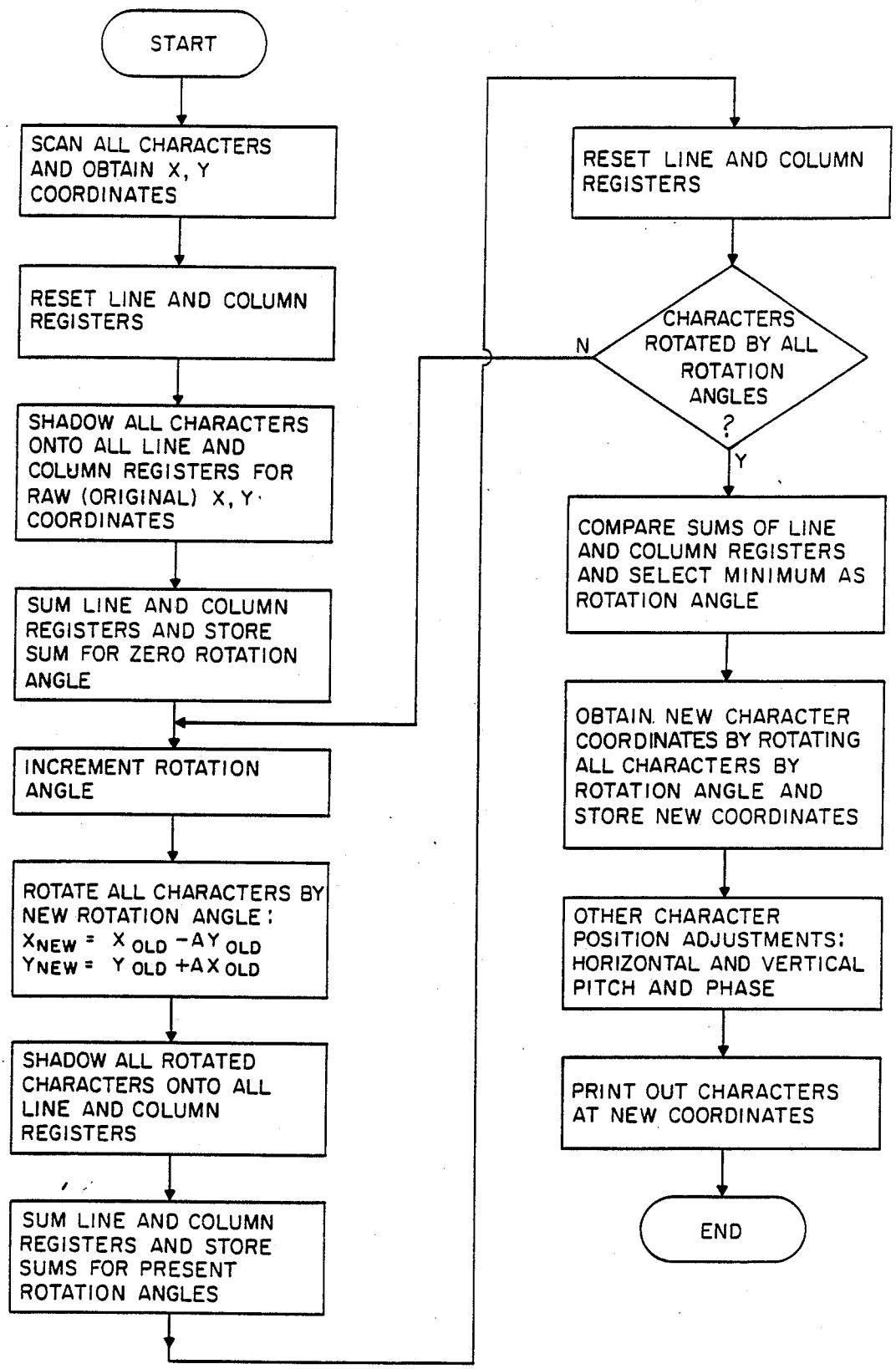
FIG. 10 is a flowchart illustrating the steps for determining and correcting skew of characters appearing on a document.

FIG. 9C shows the shadowing for the line of characters shown in FIG. 9B when the rotation angle is A, which may be, for example, 10 milliradians, (it being understood that the angle is exaggerated for purposes of illustration). The shadowing effect for this angle produces pronounced maximum values, and it is seen that the line registers only for the lines 3 and 11 have been set to one, and the other line registers remain at zero. The sum of the line registers is two, and this value is stored for the 10 milliradian rotation angle.

After all of the character shadowing for all of the rotation angles for the clockwise and counterclockwise directions is complete, the rotation angle having the smallest line register sum is determined to be the horizontal skew angle, and all of the characters on the pages are then rotated by this particular rotation angle. For the case of FIG. 9C, the skew angle A will likely be determined to be 10 milliradians. The coordinates of all of the characters are then rotated, according to the formulas given above, to obtain corrected coordinate values available for use in subsequent printing out of the characters by a printer.

In addition to the horizontal skew detection and correction outlined above, the preferred embodiment determines and corrects for vertical skew as well, by detecting the amount by which the characters are skewed vertically. The arrangement is substantially the same as the arrangement for detecting and correcting horizontal skew, except that the line registers are conceptually at the bottom margin of the page.

According to the preferred embodiment, the program outlined above would reside in ROM and be executed by a microprocessor. The line registers and other memory requirements may simply be designated locations in RAM memory, and an accumulator may be provided which could keep a running count of the number of line registers having a one bit stored therein for the particular rotation angle being tested.

It should be understood that the particular steps described above may be performed in a different manner. For example, instead of rotating all of the characters by the specified rotation angle and then shadowing all of the rotated characters onto the line registers, each character may be shadowed onto the line registers as soon as it is rotated. This alternative may require less memory. Another modification or alternative may be to provide a different set or 2048 registers for each rotation angle. The number of sets required would be 31, one set for zero rotation, 15 sets for the 15 clockwise rotation angles, and 15 sets for the 15 counterclockwise rotation angles. Each character could thus be rotated through all of the rotation angles all at once, and the registers would not have to be cleared for each rotation. While this would require more memory, the execution time may be significantly less since the raw data coordinates would not have to be repeatedly fetched In order to save computation time and program steps (and since ROM memory is relatively inexpensive), when calculating the new coordinates of X and Y during either the skew detection or correction phase with the formulas $X_{new}=X_{old}-AY_{old}$ and $Y_{new}=Y_{old}+AX_{old}$, the values of $AY_{old}$ and $AX_{old}$ may be calculated beforehand for values of $X_{old}$, $Y_{old}$ and A, and stored in look-up tables in ROM. According to the preferred embodiment, the look-up table for the values $AX_{old}$ is a two-dimensional table having values of $X_{old}$ along one table axis, (actually ranges of $X_{old}$ are used, e.g. horizontal positions 0-31, 32-63, . . . , 2016-2047), and having values of A (in units of milliradians) along the other table axis. The values of $AX_{old}$ are at the intersection of the two table axes. A separate look-up table is provided in the same manner for values of $AY_{old}$.

While the preferred embodiment has been described for recognizing the character L, this is merely exemplary of the program tables for the other characters, including numerals, punctuation marks and other symbols, in addition to alphabet characters.

While the invention has been particularly shown and described with reference to a preferred embodiment, it will be understood by those skilled in the art that numerous variations and modifications may be effected in form and details without departing from the spirit and scope of the invention.

I claim:

1. An optical character recognition device, for detecting the amount of skew of characters arranged in lines and columns on a document, comprising:

character recognizing means for scanning a document having a plurality of characters arranged in lines and columns on said document, for establishing a single reference point on the document, and for producing, for each recognized character, information indicative of the identity of the recognized characters and the original coordinate positions of each of the recognized characters relative to the said signal reference point on the document;

means for calculating coordinate data of each of said recognized characters by rotating the coordinate position of each of said recognized characters through each of a plurality of rotation angles about the said single reference point;

shadow effect calculation means for calculating the shadowing effect that the coordinate position of each character creates along at least one margin of the document for said plurality of rotation angles including the rotation angle of zero; and shadow effect detection means for detecting the rotation angle creating the narrowest shadow effect along said margin of the document, and taking this rotation angle as the angle at which the lines of characters are skewed on the document.

2. The optical character reader according to claim 1, further including means for adjusting the original coordinate data of each character to obtain adjusted coordinate data using the rotation angle creating the narrowest shadow effect 3. The optical character reader according to claim 2 further including a printer connected to receive the character identity information and adjusted coordinate data, for printing the characters according to their adjusted coordinates 4. The optical character reader according to claim 1 wherein the means for calculating new coordinate data comprises means for calculating new coordinates ($X_{new}$, $Y_{new}$) from the original coordinates ($X_{old}$, $X_{old}$) according to the equations:

$$X_{new}=X_{old}-AY_{old} \text{ and}$$

$$Y_{new}=Y_{old}+AX_{old},$$

where A is the rotation angle.

5. The optical character reader according to claim 1 wherein the means for calculating coordinate data comprises means for calculating new coordinate data by mathematically rotating each character through each of a plurality of equally spaced rotation angles in both the clockwise and counterclockwise rotational directions relative to said reference point on the document.

6. The optical character reader according to claim 1 wherein the means for calculating the shadowing effect of each character comprises:

first memory means, having a different margin storage location corresponding to each value of coordinate position along the margin of the document on a first coordinate axis, for storing information indicating whether at least one character of all the characters rotated by the same rotation angle has one selected axis coordinate the same as said margin coordinate position;

summing means for determining the number of margin storage locations having at least one character, of all the characters rotated by the same rotation angle, with an axis the same as said margin coordinate position and for producing sum data indicative thereof;

second memory means for storing said sum data for each rotation angle by which said characters are rotated;

and wherein the shadow effect detection means comprises means for determining the lowest sum data value stored in said second memory means, and wherein said rotation angle corresponding to said lowest sum data value is taken as the angle at which the characters are skewed on the document.

7. The optical character recognition device according to claim 6, wherein the first memory means comprises a binary memory having a different one bit margin storage location corresponding to each value of coordinate position, wherein the state of each one bit storage location has one logic level if at least one character of all the characters rotated by the same rotation angle has one selected axis coordinate the same as said margin coordinate position, and has a different logic level if no characters of all the characters rotated by the same rotation angle has one selected axis coordinate the same as said margin coordinate position.

* * * * *